July 4, 1944.   A. W. MAULDING   2,352,726
WORK HANDLING MECHANISM
Filed Aug. 19, 1942   3 Sheets-Sheet 1

INVENTOR
Arthur W. Maulding
BY
Donald U. Rich
ATTORNEY

July 4, 1944.　　A. W. MAULDING　　2,352,726
WORK HANDLING MECHANISM
Filed Aug. 19, 1942　　3 Sheets-Sheet 3

INVENTOR
Arthur W. Maulding
BY
ATTORNEY

Patented July 4, 1944

2,352,726

UNITED STATES PATENT OFFICE 2,352,726

WORK HANDLING MECHANISM

Arthur W. Maulding, Chicago, Ill., assignor to American Car and Foundry Company, New York, N. Y., a corporation of New Jersey Application August 19, 1942, Serial No. 455,304

7 Claims. (Cl. 214—1)

This invention relates to work handling mechanism in general and in particular to an axle handling mechanism to feed axles into and through a machine for performing operations on the axle.

In handling axles into and out of lathes, burnishing machines, etc., it has been the custom in the past to use either hand or power operated hoists carried by overhead tracks or booms. Railway car axles will vary in weight from four hundred to twelve hundred pounds each and quite frequently improper operation of the hoist device would cause the axle to strike parts of the machine resulting in damage both to the machine and to the axle. In practically all instances the final operation on the axle was a burnishing of the journals and a comparatively slight blow on the journal would require scrapping of the entire axle. It is an object, therefore, of the present invention to provide a mechanism for feeding axles into and out of a burnishing machine without any possibility of damage to the axle journals.

A further object of the invention is the provision of an axle handling machine for feeding axles by gravity into and out of the burnishing machine.

A still further object of the invention is the provision of a work handling mechanism for feeding work to and from a machine with the mechanism forming a part of the storage surfaces or racks for the work.

These and other objects of the invention will be apparent to persons skilled in the art from a study of the following description and accompanying drawings, in which.

Figure 3:
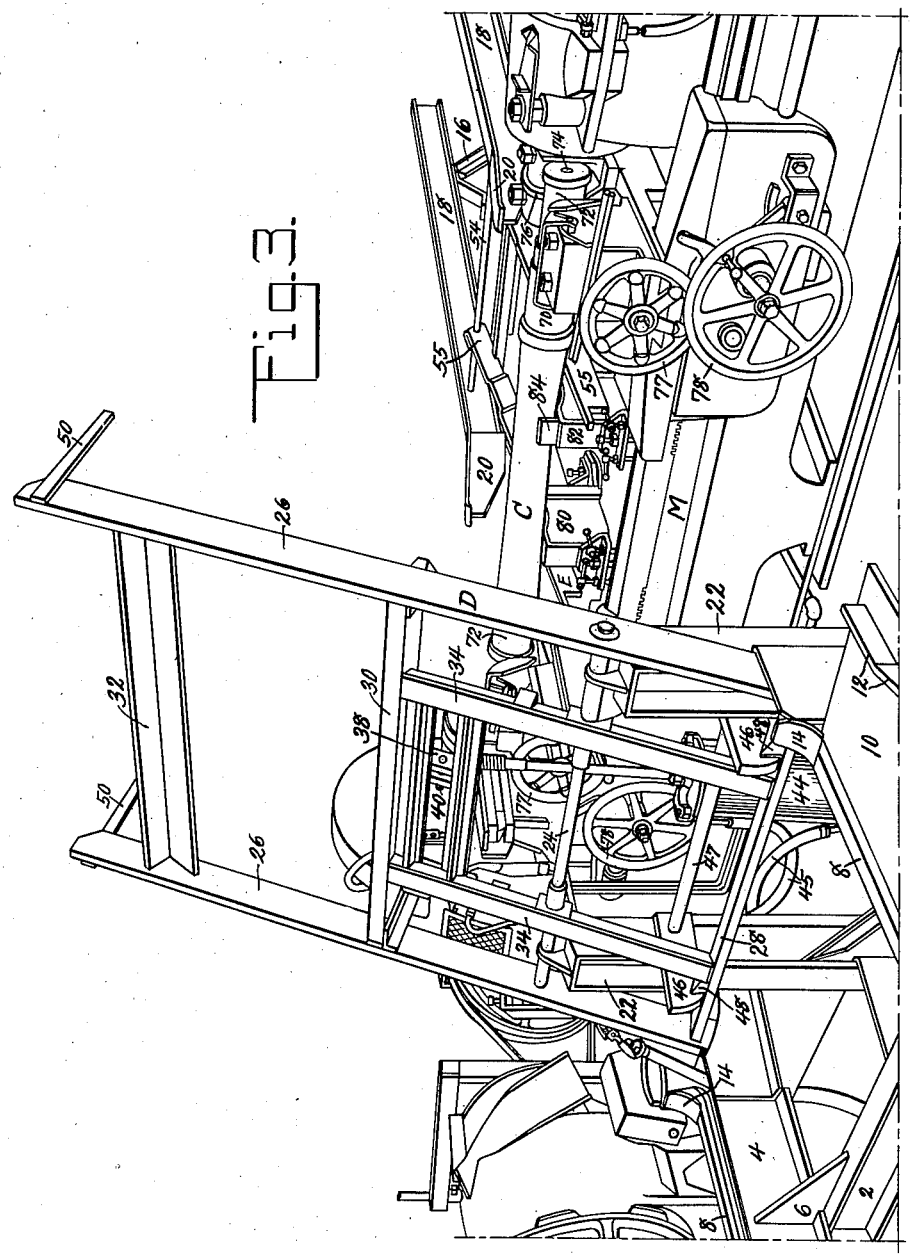
Fig. 3 is a perspective view of the mechanism in the position which it occupies while an operation is being performed on the work.
Figure 4:
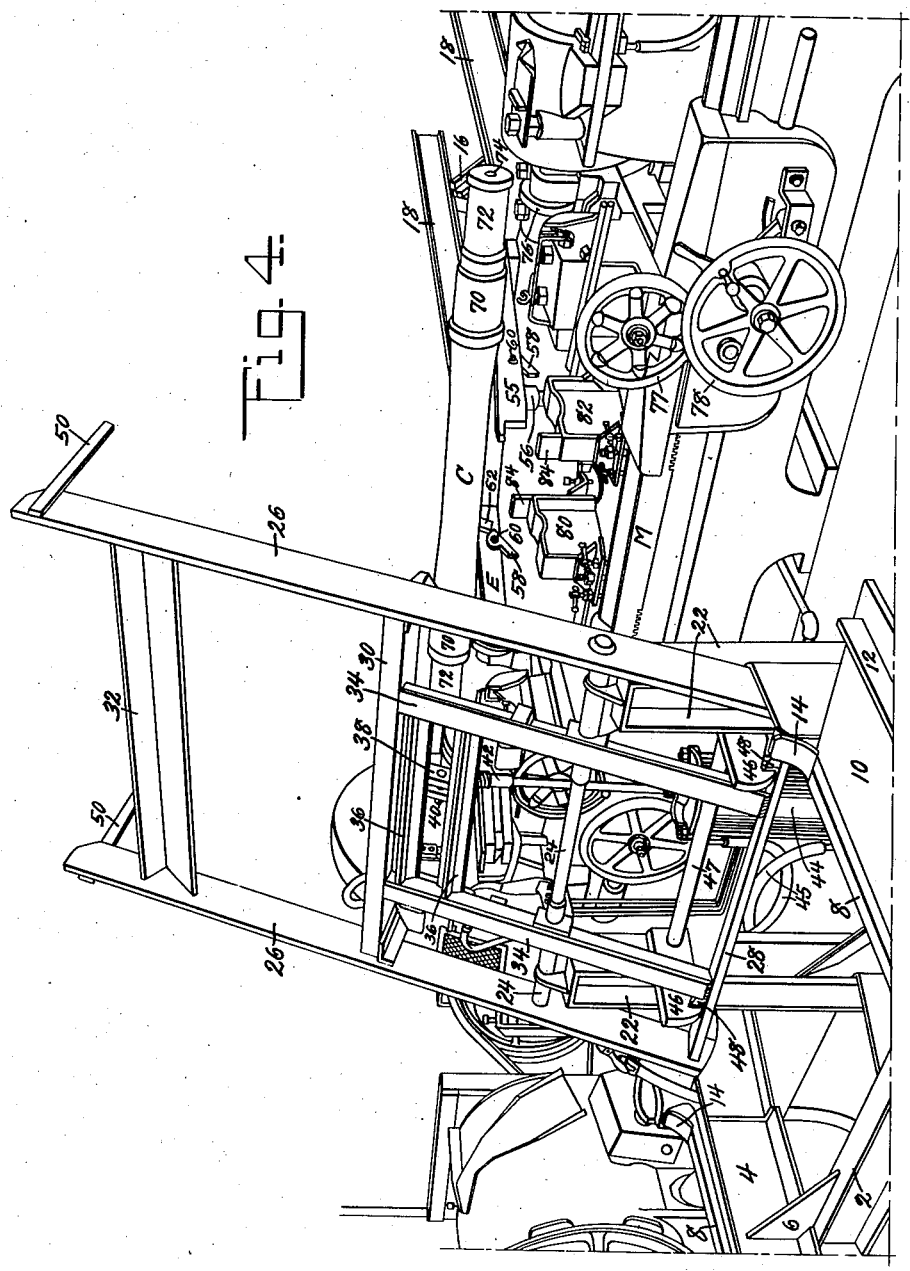
Fig. 4 is a perspective view of the mechanism in position to discharge the finished work from the machine.

Referring now to the drawings in detail, it will be seen that the mechanism consists of a rough work storage rack A and a finished storage rack B spaced apart a sufficient distance to receive a machine M, with the space between the racks spanned by pivoted sections D and E pivoted respectively to the rough and finished storage racks. The rough storage rack may be made in any suitable form but in the present case it is shown as made up of supporting cross members 2 upon which rest I-beams 4 anchored to the supports and braced by gussets 6. To the top surface of the I-beams are welded or otherwise attached bars 8 forming a work supporting surface or rails along which the work may be moved toward the machine. At least one of the I-beams has welded or attached thereto an extension plate 10 to which is welded or otherwise secured an upstanding plate or bar 12. This upstanding bar is adapted to contact the end of the axles C and thus positively locate the lengthwise position of the axle with respect to the machine. As clearly shown in Figs. 2, 3 and 4, the ends of rails or supporting surfaces 8 terminate in upwardly curved stops 14 adapted to check the movement of the axles or work along the rails 8. The finished work receiving rack B is very similar in construction to the rough work rack A, that is, it is formed of supports 16 to which are attached longitudinally extending I-beams 18, all as clearly shown in Fig. 3. The ends of the I-beams are inclined upwardly toward the machine as at 20, thus providing a comparatively sharply inclined starting surface to start the axle rolling and carry it away from the machine. Thus it will be seen that the work supporting racks A and B are formed of pairs of work supporting surfaces or rails spaced apart a sufficient distance to accommodate the machine M.

Figure 1:
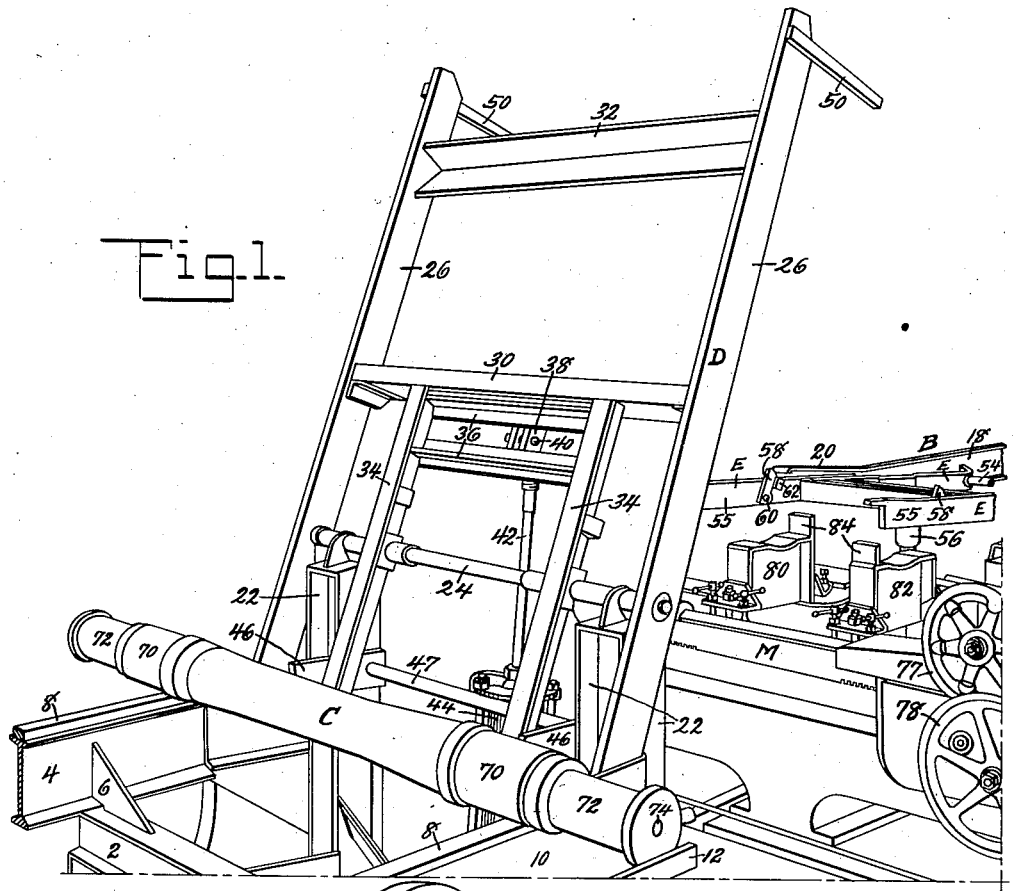
Figure 1 is a perspective view of the mechanism.
Figure 2:
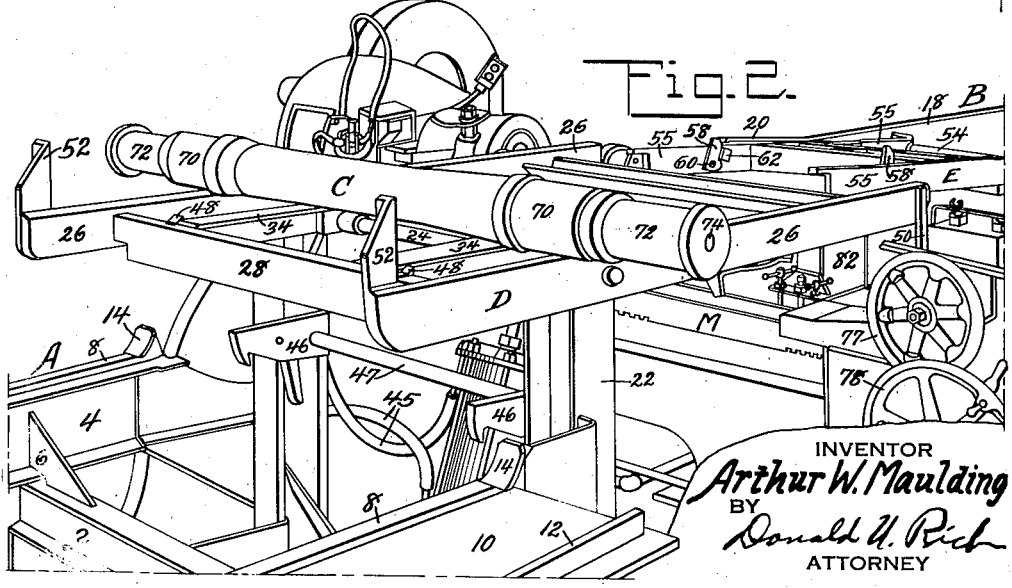
Fig. 2 is a perspective view of the mechanism showing the work in a raised position for movement by gravity toward the machine.

The ends of I-beams 4 have welded or otherwise secured thereto uprights 22 carrying at their upper ends a transversely extending pivot rod 24. The pivot rod 24 has mounted thereon the pivot section D. This section, as clearly shown by the drawings, is of general rectangular formation and is constructed of side pieces 26 tied together by rear, intermediate and front ties 28, 30 and 32 respectively. Additional bracing and support for the pivoted section is provided through intermediate longitudinal ties 34 connected to the end and intermediate ties 28 and 30. The longitudinal ties or braces are mounted upon the pivot rod to assist in support of the section and are tied together by T-irons 36 to which are attached plates 38. The plates 38 are pierced to receive a pivot pin 40 to which is connected the outer end of a piston rod 42 adapted to reciprocate in a cylinder 44 mounted between and adjacent the uprights 22. Any suitable fluid under pressure is fed to the cylinder through pipes 45 thereby causing reciprocation of the piston rod in the cylinder and thereby controlling the movements of the pivoted section D. Since an operator must pass beneath the pivoted section D safety catches or hooks 46 are provided mounted on rod 47 carried by uprights 22. The hooks are adapted to engage lugs 48 welded or otherwise secured to the rear tie 28 and will normally hold the pivoted section in the raised position of Figs. 1, 3 and 4. Short legs 50 are attached to the side pieces 26 and are adapted to come in contact with a portion of the bed of the machine M, thus positively positioning the pivoted section D with respect to the machine when in the lowered position as shown in Fig. 2. The rear ends of the side pieces have attached thereto angle stops or pick-ups 52, clearly shown in Fig. 2 and adapted to pick up the axle during the downward pivoting movement of the sections D from the position of Fig. 1 to that of Fig. 2.

The finished work receiving rack B carries transversely extending rod 54 forming a pivotal axis for the pivoted section E. This pivoted section is formed of side pieces 55 suitably braced and tied together and extending inward toward and over a portion of the machine of a sufficient length to interleave with the side pieces 26 of the pivoted section D. Pivotal motion of the section E about its pivoted rod or axis 54 is controlled by a cylinder and piston rod, the latter of which is indicated at 56, Figs. 1 and 4. Small stops 58 are pivotally mounted as at 60 on the side pieces 55 and are backed up by stops 62 welded or otherwise attached to the side pieces, thus the pivoted stops may be held in the position of Figs. 1 and 2 or readily rotated to hang in the position shown in Fig. 4. When in a raised position, shown by Figs. 1 and 2, they project above the top surface of side pieces 55 and prevent further movement of the axle, but when in the down position of Fig. 4 they permit the passage of the axle along the side pieces. As clearly shown by the figures, the pivoted section E moves from its upper position of Figs. 1, 2 and 4 to its lower position of Fig. 3, all under control of the piston rod indicated at 56. When in the raised position the top surface of rails 55 are substantially in alignment with the top surface of side pieces 26 and of extensions 20 on rack B. Thus the pivoted sections D and E span the space between fixed sections A and B of the work support and control movements of the work into and out of the machine which is to operate on the work.

The work, which in this case is shown as axle C, is of conventional form having a wheel receiving part 70, journal 72 and centers 74. It will, of course, be obvious that work of a different type may be handled by the mechanism and that the journal may be located differently with respect to the wheel bearing portion. The machine M, located in the space between fixed work supporting members A and B, has been shown as a burnishing machine having burnishing wheels 76 which may be moved toward each other by a hand wheel 77. Movement of the burnishing wheels along the journal is controlled either by hand wheel 78 or by conventional power drive. The axle is held centered as in the conventional lathe and burnishing machine and will be rotated by any suitable power mechanism. The bed of the burnishing machine has mounted thereon two supports 80 and 82 each formed with a curved upper surface adapted to engage a portion of the axle and prevent movement of the axle out of its true position substantially in alignment with the centers of the burnishing machine. Each of the stops is also provided with an upstanding lug 84 to additionally prevent rolling or movement of the axle while being raised out of the machine or lowered into the machine.

The operation of the mechanism is as follows and assuming that an axle C has rolled along rails 8 to the position of Fig. 1: With the axle in the position of Fig. 1 the operator releases safety catches 46 and turns motive power into cylinder 44 pulling the pivoted section D downwardly about its pivotal axis to the position shown in Fig. 2. During the downward swinging of the pivoted section the stops 52 have been raised back of the axle and held it during movement of the section from that of Fig. 1 to that of Fig. 2. As shown in Fig. 2, the short feet or supports 50 are resting on the machine bed and the top surfaces of side pieces 26 cause the axle to rotate or roll along the surfaces and onto the aligned surfaces of pivoted section E. In order to check rolling of the axle the stops 58 of pivoted section E are turned up to the position shown in Fig. 2 and the axle will be held by the stops in a position corresponding to the position shown in Fig. 4. With the axle held in this position by the stops the operator again admits motive power to cylinder 44 and raises the section D upwardly to the position shown in Figs. 1, 3 and 4, then motive power is admitted to the cylinder controlling piston 56 and the pivoted section E is lowered from the position of Fig. 2 to the position of Fig. 3 in which the side pieces are clear of the axle and the axle is supported by the curved upper surfaces or supports 80 and 82 carried by the machine bed. Excessive rolling of the axle during lowering of section E will be checked by the stops 84. With the axle held by the supports 80 and 82 the machine centers may be forced into the centers 74 of the axle thus raising it clear of the supports 80 and 82 and holding it in position to be operated on by the burnishing wheels. After completion of the burnishing operation retraction of the machine centers lowers the axle onto machine supports 80 and 82. The operator then throws stops 58 downwardly to the position shown in Fig. 4 and admits motive power to the cylinder controlling piston 56, thus raising the axle off of the machine supports 80 and 82 and bringing it to the position shown in Fig. 4. The axle then rolls freely along side pieces 55 and onto the side pieces or rails of fixed section B comprising the finished work storage rack. Thus it will be seen that the first pivoted section D elevates the work from the supporting surface or rails 8 and causes the axle to roll by gravity toward the machine with the motion checked by stops 58 on the second pivoted section E. This second pivoted section can by proper manipulation lower or raise the work into or out of the machine. Proper manipulation of the stops will, of course, permit gravity movement of the work along the second pivoted section E onto the finished work storage rack B. It will also be seen that if an operator should desire to send an axle through the machine without operating on the work such movement may readily be accomplished by merely having the stops 58 turned down when the parts are in the position of Fig. 2. The sections D and E, therefore, in effect constitute continuations or parts of the work supporting racks A and B which of necessity are spaced apart sufficiently to receive the machine. Operation of the machine is in no way hampered since the section D is out of the road of the operator when standing at the controls of the machine. Due to the arrangement of the pivoted sections and supports it is impossible for an operator to damage the axle journals for the axle is properly positioned by the plate 12 and by the curved surfaces of machine supports 80 and 82 which assist the stops 58 in that they prevent any rotation of the axle in the machine after being lowered by section E.

While the work has been illustrated as an axle, it is obvious that other articles can be handled in the same way and that lathes, grinders, etc., can be substituted for the burnishing machine shown. Also, while the mechanism has been shown and described in detail, it will be obvious to persons skilled in the art that various modifications and rearrangements of parts may be made but all such modifications and rearrangements are contemplated as will fall within the scope of the appended claims defining my invention.

What is claimed is:

1. In an axle handling mechanism of the character described including spaced apart pairs of rails along which the axles may roll, a pair of pivoted sections interposed in the space between the pairs of rails and bridging a machine for operating on the axles and located in the space, one of said pivoted sections rotating about a pivot located above and adjacent to one of the pairs of rails and elevating the axle during its rotation toward the other section, and the other pivoted section receiving the axle from said one section and lowering it into position in the machine, said axle rolling by gravity along said other pivoted section toward said one pivoted section during lowering into position in the machine.

2. In an axle handling mechanism of the character described including spaced apart pairs of rails along which the axles may roll, a pair of pivoted sections interposed in the space between the pairs of rails and bridging a machine for operating on the axles and located in the space, one of said pivoted sections rotating about a pivot located above and adjacent to one of the pairs of rails and elevating the axle during its rotation toward the other section, and the other pivoted section rotating about a pivot carried by the other pair of said rails and receiving the axle from said one section and lowering it into position in the machine, and means to swing said other pivoted section about its pivot thereby raising the axle out of the machine whereby it may roll by gravity onto the other of the pairs of rails.

3. In an axle handling mechanism of the character described including a first pair of rails along which the axles may roll toward a machine for performing an operation on the axle, a first section pivotally mounted on an axis adjacent the machine end of said first pair of rails and swingable about said axis from a raised position to a lowered position resting on the machine, a second pair of rails located on the opposite side of the machine from said first pair of rails, a rod extending between and carried by said second pair of rails adjacent the machine end thereof, a second section pivotally mounted on said rod and swingable about said rod from a lowered position in contact with the machine to a raised position holding the axle above the machine.

4. In an axle handling mechanism of the character described including a first pair of rails along which the axles may roll toward a machine for performing an operation on the axle, a first section pivotally mounted on an axis adjacent the machine end of said first pair of rails and swingable about said axis from a raised position to a lowered position resting on the machine, a second pair of rails located on the opposite side of the machine from said first pair of rails, a rod extending between and carried by second pair of rails adjacent the machine end thereof, a second section pivotally mounted on said rod and swingable about said rod from a lowered position in contact with the machine to a raised position holding the axle above the machine, said first section when lowered and said second section when raised together forming an incline down which an axle may roll toward and onto the second pair of rails from the first pair of rails.

5. In an axle handling mechanism of the character described including a first pair of rails along which the axles may roll toward a machine for performing an operation on the axle, a first section pivotally mounted for swinging movement on an axis adjacent the machine end of said first pair of rails and swingable about said axis from a raised position to a lowered position resting on the machine, a second pair of rails located on the opposite side of the machine from said first pair of rails, a second section pivotally mounted for swinging movement on an axis adjacent the machine end of said second pair of rails and swingable about said axis from a lowered position in contact with the machine to a raised position holding the axle above the machine, independent power means connected to said first and second sections at points remote from their pivotal axes for independently swinging the same about their respective axes.

6. In an axle handling mechanism of the character described including a first pair of rails along which the axles may roll toward a machine for performing an operation on the axle, a first section pivotally mounted for swinging movement on an axis adjacent the machine end of said first pair of rails and swingable about said axis from a raised position to a lowered position resting on the machine, a second pair of rails located on the opposite side of the mchine from said first pair of rails, a second section pivotally mounted for swinging movement on an axis adjacent the machine end of said second pair of rails and swingable about said axis from a lowered position in contact with the machine to a raised position holding the axle above the machine, said second section when in lowered position being inclined whereby the axle may roll toward the first pair of rails and when in raised position being inclined whereby the axle may roll toward and onto the second pair of rails.

7. In an axle handling mechanism of the character described including a first pair of rails along which the axles may roll toward a machine for performing an operation on the axle, a first section pivotally mounted for swinging movement on an axis adjacent the machine end of said first pair of rails and swingable about said axis from a raised position to a lowered position resting on the machine, a second pair of rails located on the opposite side of the machine from said first pair of rails, a second section pivotally mounted on the second pair of rails for swinging movement about an axis adjacent the machine end of said second pair of rails and swingable about said axis from a lowered position in contact with the machine to a raised position holding the axle above the machine, said first section when lowered and said second section when raised together forming an incline down which an axle may roll toward the second pair of rails from the first pair of rails, said sections having the adjacent free ends interleaved to form a substantially continuous inclined supporting table for the axle, and stops on said second section to check the axle after it has rolled clear of said first section.

ARTHUR W. MAULDING.